(12) United States Patent
Boulware, Sr.

(10) Patent No.: US 8,454,094 B1
(45) Date of Patent: Jun. 4, 2013

(54) COMBINED DEODERIZING AND AIR FRESHENING VEHICLE SEAT CUSHION AND ASSOCIATED METHOD

(76) Inventor: Dana Boulware, Sr., Chester, PA (US)

( * ) Notice: Subject to any disclaimer, the term of this patent is extended or adjusted under 35 U.S.C. 154(b) by 281 days.

(21) Appl. No.: 12/978,231

(22) Filed: Dec. 23, 2010

Related U.S. Application Data (63) Continuation-in-part of application No. 12/313,681, filed on Nov. 24, 2008, now abandoned.

(51) Int. Cl.
*A47C 7/02* (2006.01)

(52) U.S. Cl.
USPC ............ 297/452.42; 297/452.46; 5/641; 5/652.1; 454/120

(58) Field of Classification Search
USPC ............ 5/630, 632, 638, 639, 641, 690, 694, 5/724, 652, 652.1, 653; 297/188.01, 188.08, 297/452.42, 452.46; 454/120
See application file for complete search history.

(56) References Cited

U.S. PATENT DOCUMENTS

| | | | | |
|---|---|---|---|---|
| 3,638,255 A * | 2/1972 | Sterrett | ............................. | 5/641 |
| 3,818,522 A * | 6/1974 | Schuster | ........................ | 5/652.1 |
| 5,226,188 A * | 7/1993 | Liou | ............................... | 5/652.1 |
| 5,918,333 A * | 7/1999 | Takashima | ........................ | 5/641 |
| 6,269,504 B1 * | 8/2001 | Romano et al. | .................... | 5/690 |
| 7,073,223 B2 * | 7/2006 | Huza | ................................. | 5/653 |
| 8,056,168 B2 * | 11/2011 | Asaka et al. | ...................... | 5/645 |
| 2003/0182725 A1 * | 10/2003 | Baik | ................................. | 5/640 |
| 2009/0134675 A1 * | 5/2009 | Pfahler | ...................... | 297/180.1 |

* cited by examiner

*Primary Examiner* — Robert G Santos
*Assistant Examiner* — Nicholas Polito (57) ABSTRACT

A combined deodorizing and air freshening vehicle seat cushion for removing odors and releasing a pleasant aroma in a vehicle may include primary bodies oriented in a side-by-side configuration. The primary bodies may include a deodorizing agent contained within an internal cavity of the primary bodies for filtering and deodorizing the airborne odor in the ambient air. Auxiliary bodies may be contiguously conjoined to the primary bodies and may include freshening agents for impregnating the deodorized ambient air with pleasant aromas. An air-permeable fluid-absorbent liner preferably has pivotally coupled seat and back portions removably positioned over the primary and auxiliary bodies respectively. A communications link provides a passageway for circulating air throughout first and groups of primary bodies defined along seat and back rest sections of the apparatus.

19 Claims, 7 Drawing Sheets

COMBINED DEODERIZING AND AIR FRESHENING VEHICLE SEAT CUSHION AND ASSOCIATED METHOD

CROSS REFERENCE TO RELATED APPLICATIONS

This application is a continuation-in-part application of U.S. patent application Ser. No. 12/313,681, filed Nov. 24, 2008, which claims the benefit of U.S. Provisional Application No. 61/004,963, filed Dec. 3, 2007, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to seat cushions and, more particularly, to a combined deodorizing and air freshening vehicle seat cushion for removing odors and releasing a pleasant aroma in a vehicle.

2. Prior Art

Generally, odor components such as tobacco smoke adhere to interior parts, such as an instrument panel, a steering wheel and a seat, in the passenger compartment of automobiles. The extrication of such odor components from the interior parts results in odor in the passenger compartment. An adhesive agent, which is used for fixing the interior parts, also causes compartment odors. With regard to a seat of the vehicle, a backing material is generally applied to a rear surface of a seat cover member for reducing removal of fibers of the cover member.

In some cases, activated carbon is added to the backing material. The activated carbon adsorbs odor components caused by a passenger's sweat and smell of tobacco smoke, thereby deodorizing the air in the passenger compartment. However, if the vehicle is parked under the blazing sun, as often happens in daily use, the deodorizing capacity of the activated carbon is saturated. As a result, the odor components are extricated from the activated carbon. Thus, after a period of time the odor in the compartment will remain and increase unless other measures are taken to remove or eliminate such odors.

U.S. Pat. No. 5,707,107 to Melone discloses a cover for the seat back and head rest of a motor vehicle having bucket seats. The cover is designed with the look and feel of a typical hooded sweatshirt. Features such as a "hood", "hand warmer" type pockets and a stretchable waistband enhance the illusion. The cover uses typical sweatshirt materials which have a variety of desirable characteristics. For example, a cotton facing with cotton fleece lining is hypo allergenic and has the desirable combination of stretch and absorbency. The cover also provides a venue for the display of popular logos, such as sports team names or college names in an automobile. The cover is easy to remove and install.

Moreover, a "hand warmer" pocket is provided in the lumbar region in the seat back front, which may be stuffed with soft material to enhance comfort and lumbar support. Other pockets may be provided on a back side for maps or other items which may be conveniently stored within. Unfortunately, this prior art reference does not disclose a method of removing odors or releasing a pleasant aroma within the vehicle.

U.S. Pat. No. 6,746,069 to McKenzie discloses a cover system for use with a vehicle having a seat includes a mounting member that is attachable to the vehicle. The cover system further includes a cover movably associated with the mounting member such that the cover is unrollable from a stored position to a deployed position in which the cover extends at least partially over the seat. Unfortunately, this prior art reference does not disclose any means of preventing the lasting effects of unpleasant odors within the vehicle.

U.S. Pat. No. 6,926,601 to Aoki discloses a deodorizing apparatus for a vehicular passenger compartment. The apparatus operates when an ignition key is off and it is determined that a density of odor components in the passenger compartment is equal to or higher than a predetermined level. It is determined whether an inside temperature inside the passenger compartment measured by a temperature sensor is equal to or higher than a predetermined temperature, which is suitable for separating odor components adhered to the passenger compartment. When it is determined that the inside temperature is equal to or higher than the predetermined temperature, a deodorizing operation is performed by a deodorizing means. When it is determined that the inside temperature is lower than the predetermined temperature and it is not assumed that the inside temperature naturally increases to the predetermined temperature, the passenger compartment is heated by a compartment heating device so that the inside temperature reaches the predetermined temperature.

Unfortunately, this prior art reference would require complicated installation procedures or purchase of new vehicle seats, and would not be easily removable and operated by average consumers. Accordingly, a need remains for a combined deodorizing and air freshening vehicle seat cushion in order to overcome the above-noted shortcomings. The present invention satisfies such a need by providing a device that is convenient and easy to use, is durable yet lightweight in design, is versatile in its applications, and provides for removing odors and releasing a pleasant aroma in a vehicle.

BRIEF SUMMARY OF THE INVENTION

In view of the foregoing background, it is therefore an object of the present invention to provide an apparatus for removing odors and releasing a pleasant aroma in a vehicle. These and other objects, features, and advantages of the invention are provided by a combined deodorizing and air freshening vehicle seat cushion.

A combined deodorizing and air freshening vehicle seat cushion for removing odors and releasing a pleasant aroma in a vehicle may include a plurality of centrally aligned primary bodies oriented in a side-by-side configuration. The seat cushion may also include a plurality of auxiliary bodies contiguously conjoined to the primary bodies and preferably laterally spaced apart at opposed ends of the primary bodies respectively. Also, the primary bodies may include a mechanism for deodorizing ambient air by removing airborne odor from the ambient air.

Further, the auxiliary bodies may include a mechanism for impregnating the deodorized ambient air with a pleasant aroma as the primary bodies are compressed in such a manner that the deodorized and impregnated ambient air may thereafter be released from the auxiliary bodies. The present invention, as claimed, provides the unexpected and unpredictable benefit of not only removing odor from the air, but also emitting cleansed and aroma infused air simply by applying pressure to the apparatus. Thus, by using the apparatus as a seat cushion in a vehicle or even at home or in the office, the user may simply sit on the cushion to cleanse and refresh the surrounding air.

In the preferred embodiment, the ambient air deodorizing mechanism and the impregnating mechanism may be in fluid communication with each other for automatically channeling the ambient air into the auxiliary bodies after deodorizing the ambient air. Further, the impregnating mechanism may be located downstream of the ambient air deodorizing mechanism. In this manner, as unpleasant smelling air enters the apparatus, such as air from cigarette smoke, pets, or garbage, it may first be deodorized and then channeled through to be filled with a pleasurable aroma before being released back into the user's vehicle.

The ambient air deodorizing mechanism may further include a deformably resilient inner layer preferably spanning along an inner perimeter of each of the primary bodies such that a hollow cavity may be defined within the inner layer. The inner layer may be provided with a plurality of orifices formed therein which may penetrate through an outer surface of the primary bodies respectively for permitting the ambient air to enter the cavity. In addition, a predetermined quantity of a deodorizing agent may be contained within the cavity for filtering the airborne odor.

The deodorized ambient air may be forcibly urged laterally towards opposed ends of the cavity when a user sits on the primary bodies such that the deodorized ambient air may be dissipated throughout the cavity and thereby cleansed of the airborne odors. By simply sitting on the seat cushion, the user forces air in through the orifices and across the deodorizing agent, advantageously removing the unpleasant odors from the air. The deodorizing agent may be selected from a group including charcoal powder, rigid annular' charcoal balls and any combination thereof.

The impregnating mechanism may further include a plurality of outlet ports formed in the inner layer and extended through to the auxiliary bodies such that the outlet ports may terminate inside the auxiliary bodies. Additionally, first and second pairs of flaps may be pivotally coupled to the inner layer and positioned adjacent to the outlet ports respectively. The first and second pairs of flaps may be situated at a closed equilibrium position when the inner layer is at an equilibrium position and thereby prohibit the deodorized ambient air from passing through the outlet ports. This prevents the deodorized air from accessing the impregnating mechanism until the user applies pressure to the seat cover by sitting on it, advantageously preserving the effects of adding pleasant aroma to the air until a user chooses to operate the apparatus.

The first and second pairs of flaps further may automatically pivot to a tensioned open position when an external force is downwardly exerted onto the inner layer such that the deodorized ambient air may be laterally forced through the outlet ports and deposited into the auxiliary bodies respectively. This force may be generated simply be the user sitting on the seat cushion. Also, the first and second pairs of flaps may automatically pivot back to the equilibrium closed position after the deodorized ambient air egresses the cavity and the inner layer returns to the equilibrium position.

The first and second pairs of flaps may be independently articulated between the equilibrium closed position and the tensioned open position when the user engages and disengages the primary bodies. Thus, to operate the impregnating mechanism, the user may sit on the seat cushion forcing the first and second pairs of flaps open and the deodorized air into the impregnating mechanism to be infused with the pleasant aroma before being released back out of the seat cushion.

Each of the auxiliary bodies may further include an inner surface contiguously traveling along an inner perimeter of the auxiliary bodies respectively. The inner surface may be permeated with a freshening agent that impregnates the deodorized ambient air as the deodorized ambient air ingresses the auxiliary bodies. Such a freshening agent may contain a variety of aromas and pleasurable scents as chosen by the individual user, advantageously filling the air and making for a more enjoyable driving experience while using the seat cushion.

Each of the outlet ports may further include a one-way valve hingedly mated thereto for permitting the deodorized ambient air to exit the primary bodies while prohibiting the impregnated deodorized ambient air from re-entering the primary bodies respectively. Each of the one-way valves may be independently and automatically biased between open and closed positions when an internal air pressure level inside the cavity of the primary bodies exceeds a maximum threshold air pressure level. This operates such that when the user applies pressure to the primary body by sitting on the seat cushion, the deodorized air may build sufficient pressure to be forced through the one way valve and into the auxiliary bodies to be impregnated by the freshening agent.

The present invention may further include a method for removing odors from ambient air and releasing a pleasant aroma in a vehicle. Such a method may include the chronological steps of first providing and orienting a plurality of centrally aligned primary bodies in a side-by-side configuration. Second, the method may include providing and contiguously conjoining a plurality of auxiliary bodies to the primary bodies by laterally spacing apart the auxiliary bodies at opposed ends of the primary bodies respectively.

A third step may include deodorizing ambient air by removing air-borne odor from the ambient air while traveling through the primary bodies. Fourth, the method may include automatically channeling the deodorized ambient air into the auxiliary bodies after passing through the primary bodies. Finally, a fifth step may include impregnating the deodorized ambient air with a pleasant aroma as the primary bodies are compressed such that the deodorized and impregnated ambient is thereafter released from the auxiliary bodies.

The apparatus may further include an air-permeable fluid-absorbent liner preferably having a single and unitary body provided with pivotally coupled seat and back portions removably positioned over the primary and auxiliary bodies respectively. Such a liner provides the unexpected and unpredictable advantage of absorbing the perspiration from a user's back and further prevents the odorous fluid from penetrating into the seat and back portions respectively. The liner may further be removed for cleaning as desired thus advantageously reused so that the apparatus may last for a much longer life span.

Each of the primary bodies preferably has a primary longitudinal axis axially offset from an adjacent one of the primary longitudinal axes and an auxiliary longitudinal axes registered substantially orthogonal to each of the primary longitudinal axis of the primary bodies respectively. A first group of the auxiliary bodies may therefore be aligned along a first plane and may be adapted to receive a user buttock thereon while a second group of the auxiliary bodies may be aligned along a second plane and may be adapted to receive a user back thereagainst. In this way, the apparatus can be configured into the pivotally coupled seat and back portions respectively and advantageously allow the apparatus to be used both as a seat and backrest.

The impregnating mechanism of one of the first group of auxiliary bodies may be in fluid communication with the impregnating mechanism of one of the second group of auxiliary bodies. Such an arrangement provides the unexpected and unpredictable advantage of enabling the impregnating mechanism to be arranged in a continuous flow structure so that the deodorizing mechanism may deodorize the impregnated air in the auxiliary bodies before they are released into the surroundings of the vehicle or office space.

The first and second planes may further be non-overlapping and mutually exclusive and be registered along horizontal and vertical planes respectively. Such an arrangement provides the unexpected and unpredictable advantage of allowing the back portion to be folded over the seat portion for easy removal and transporting or for preventing the liner from being heated by the hot sun for example.

The method may further include: wherein each of the primary bodies preferably having a primary longitudinal axis axially offset from an adjacent one of the primary longitudinal axes, wherein each of the auxiliary bodies preferably has an auxiliary longitudinal axis registered substantially orthogonal to each of the primary longitudinal axes of the primary bodies respectively; providing an air-permeable fluid-absorbent liner preferably having a single and unitary body provided with pivotally coupled seat and back portions; removably positioning the air-permeable fluid-absorbent liner over the primary and auxiliary bodies respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The apparatus of this invention is referred to generally in FIGS. 1-4 by the reference numeral 10 and is intended to provide a combined deodorizing and air freshening vehicle seat cushion. It should be understood that the combined deodorizing and air freshening vehicle seat cushion 10 may be used to eliminate odors and release pleasant aromas in many different applications, including passenger vehicles, with airplane seats or in passenger train compartments, or with home or office furniture, and should not be limited to the applications described herein.

Referring initially to FIGS. 1-4, a combined deodorizing and air freshening vehicle seat cushion 10 for removing odors and releasing a pleasant aroma in a vehicle may include a plurality of centrally aligned primary bodies 20 oriented in a side-by-side configuration. The seat cushion 10 may also include a plurality of auxiliary bodies 30 contiguously conjoined to the primary bodies 20 and preferably laterally spaced apart at opposed ends 21A, 21B of the primary bodies 20 respectively. Also, the primary bodies 20 may include a mechanism 40 for deodorizing ambient air by removing airborne odor from the ambient air.

Further, the auxiliary bodies 30 may include a mechanism 50 for impregnating the deodorized ambient air with a pleasant aroma as the primary bodies 20 are compressed in such a manner that the deodorized and impregnated ambient air may thereafter be released from the auxiliary bodies 30. The present invention 10, as claimed, provides the unexpected and unpredictable benefit of not only removing odor from the air, but also emitting cleansed and aroma infused air simply by applying pressure to the apparatus 10. Thus, by using the apparatus 10 as a seat cushion in a vehicle or even at home or in the office, the user may simply sit on the cushion to cleanse and refresh the surrounding air.

Figure 1:
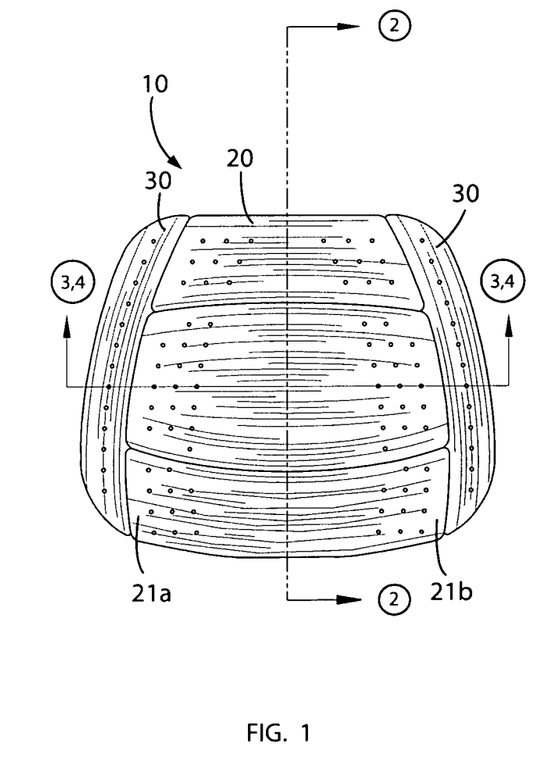
FIG. 1 is a top plan view showing a combined deodorizing and air freshening vehicle seat cushion, in accordance with the present invention.
Figure 2:
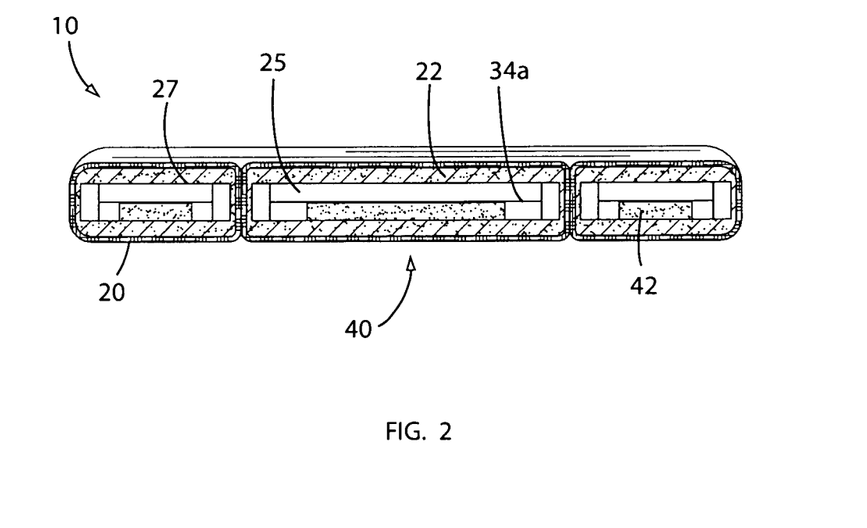
FIG. 2 is a cross-sectional view of the apparatus taken along line 2-2 in FIG. 1, showing the internal elements of the primary bodies.
Figure 3:
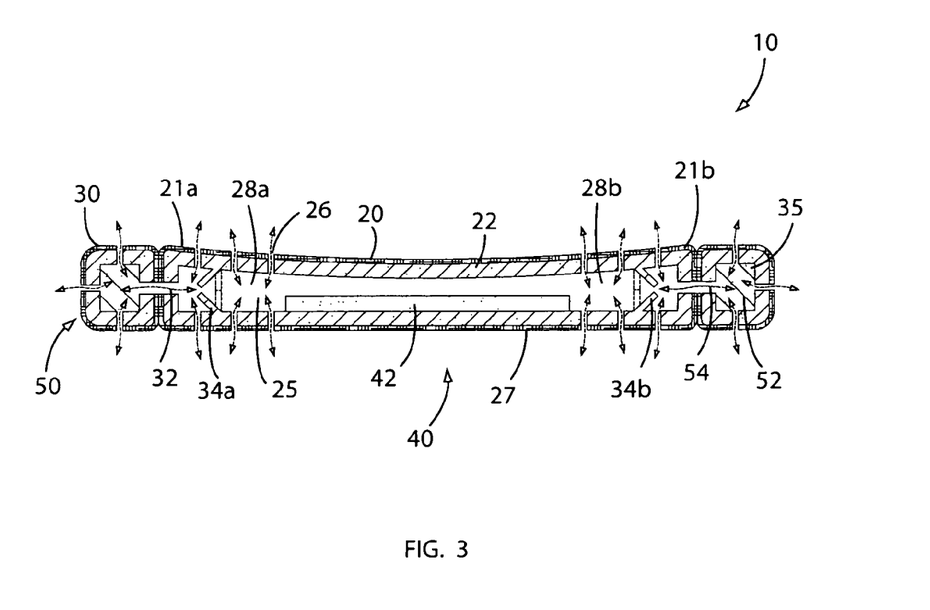
FIG. 3 is a cross-sectional view of a first embodiment taken along line 3-3 in FIG. 1, showing the flow of air through the primary bodies, into the auxiliary bodies, and out thereof.
Figure 4:
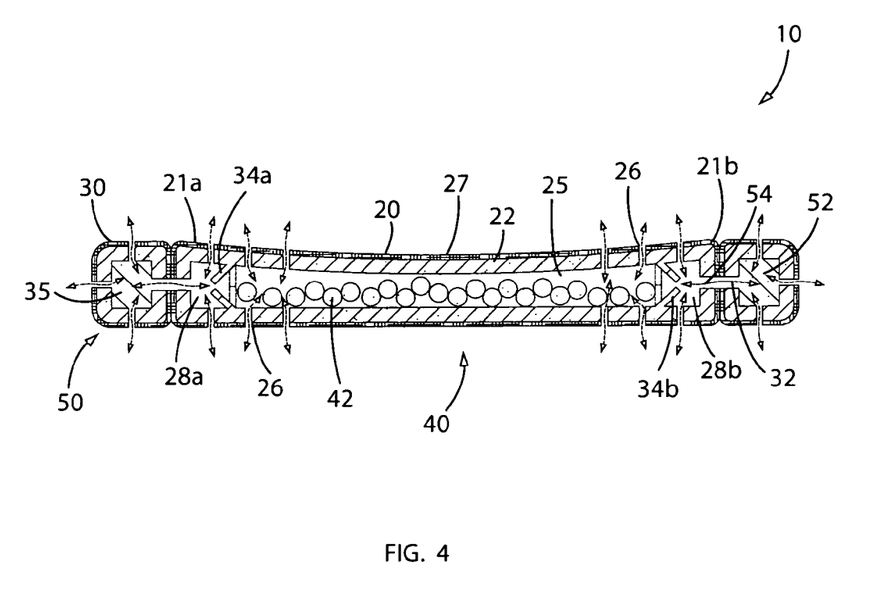
FIG. 4 is a cross-sectional view showing an alternate embodiment of the deodorizing agent within the primary bodies.

Referring now to FIGS. 2, 3, and 4, the ambient air deodorizing mechanism 40 and the impregnating mechanism 50 may be in fluid communication with each other for automatically channeling the ambient air into the auxiliary bodies 30 after deodorizing the ambient air. Further, the impregnating mechanism 50 may be located downstream of the ambient air deodorizing mechanism 40. In this manner, as unpleasant smelling air enters the apparatus 10, such as odors from cigarette smoke, pets, or garbage, it may first be deodorized and then channeled through to be filled with a pleasurable aroma before being released back into the user's vehicle.

Referring again to FIGS. 2-4, the ambient air deodorizing mechanism 40 may further include a deformably resilient inner layer 22 preferably spanning along an inner perimeter of each of the primary bodies 20 such that a hollow cavity 25 may be defined within the inner layer 22. The inner layer 22 may be provided with a plurality of orifices 26 formed therein which may penetrate through an outer surface 27 of the primary bodies 20 respectively for permitting the ambient air to enter the cavity 25. In addition, a predetermined quantity of a deodorizing agent 52 may be contained within the cavity 25 for filtering the airborne odor.

The deodorized ambient air may be forcibly urged laterally towards opposed ends 28A, 288 of the cavity 25 when a user sits on the primary bodies 20 such that the deodorized ambient air may be dissipated throughout the cavity 25 and thereby cleansed of the airborne odors by simply sitting on the seat cushion 10, the user may force air in through the orifices 26 and across the deodorizing agent 42, advantageously removing the unpleasant odors from the air.

Again referring to FIGS. 2-4, the deodorizing agent 42 may be selected from a group including charcoal powder, rigid annular charcoal balls and any combination thereof. In one embodiment, as shown in FIGS. 2 and 3, the deodorizing agent 42 may be in the form of a thin strip, coupled to the inner layer 22 of the primary bodies 20. In this manner, air may flow into the hollow cavity 25 via the plurality of orifices 26 and pass over the agent 42 to be deodorized. In another embodiment, as shown in FIG. 4, the deodorizing agent 42 may be in the form of a plurality of charcoal balls, advantageously spreading the deodorizing agent 42 throughout the hollow cavity 25 to provide further contact with air flowing throughout the primary bodies 20.

Referring again to FIGS. 2-4, the impregnating mechanism 50 may further include a plurality of outlet ports 32 formed in the inner layer 22 and extended through to the auxiliary bodies 30 such that the outlet ports 32 may terminate inside the auxiliary bodies 30. Additionally, first and second pairs of flaps 34A, 348 may be pivotally coupled to the inner layer 22 and positioned adjacent to the outlet ports 32 respectively. The first and second pairs of flaps 34A, 348 may be situated at a closed equilibrium position when the inner layer 22 is at an equilibrium position and thereby prohibit the deodorized ambient air from passing through the outlet ports 32. This prevents the deodorized air from accessing the impregnating mechanism 50 until the user applies pressure to the seat cover 10 by sitting on it, advantageously preserving the affects of adding pleasant aroma to the air until a user operates the apparatus 10.

Referring now to FIGS. 3 and 4, the first and second pairs of flaps 34A, 348 further may automatically pivot to a tensioned open position when an external force is downwardly exerted onto the inner layer 22 such that the deodorized ambient air may be laterally forced through the outlet ports 32 and deposited into the auxiliary bodies 30 respectively. Also, the first and second pairs of flaps 34A, 348 may automatically pivot back to the equilibrium closed position after the deodorized ambient air egresses the cavity 25 and the inner layer 22 returns to the equilibrium position.

The first and second pairs of flaps 34A, 348 may be independently articulated between the equilibrium closed position and the tensioned open position when the user engages and disengages the primary bodies 20. Thus, to operate the impregnating mechanism, the user may sit on the seat cushion 10 forcing the first and second pairs of flaps 34A, 348 open and the deodorized air into the impregnating mechanism 50 to be infused with the pleasant aroma before being released back out of the seat cushion 10.

Once again referring to FIGS. 3 and 4, each of the auxiliary bodies 30 may further include an inner surface 35 contiguously traveling along an inner perimeter of the auxiliary bodies 30 respectively. The inner surface 35 may be permeated with a freshening agent 42 that impregnates the deodorized ambient air as the deodorized ambient air ingresses the auxiliary bodies 30. Such a freshening agent 42 may contain a variety of aromas and pleasurable scents as chosen by the individual user, advantageously filling the air and making for a more enjoyable driving experience while using the seat cushion.

Additionally referring to FIGS. 3 and 4, each of the outlet ports 32 may further include a one-way valve 54 hingedly mated thereto for permitting the deodorized ambient air to exit the primary bodies 20 while prohibiting the impregnated deodorized ambient air from re-entering the primary bodies 20 respectively. Each of the one-way valves 54 may be independently and automatically biased between open and closed positions when an internal air pressure level inside the cavity 25 of the primary bodies 20 exceeds a maximum threshold air pressure level. This operates such that when the user applies pressure to the primary body 20 by sitting on the seat cushion 10, the deodorized air may build sufficient pressure to be forced through the one way valve 54 and into the auxiliary bodies 30 to be impregnated by the freshening agent 52.

Generally referring to FIGS. 1-4, the present invention may further include a method for removing odors from ambient air and releasing a pleasant aroma in a vehicle. Such a method may include the chronological steps of first providing and orienting a plurality of centrally aligned primary bodies 20 in a side-by-side configuration. Second, the method may include providing and contiguously conjoining a plurality of auxiliary bodies 30 to the primary bodies 20 by laterally spacing apart the auxiliary bodies 30 at opposed ends 21A, 21B of the primary bodies 20 respectively.

A third step may include deodorizing ambient air by removing air-borne odor from the ambient air while traveling through the primary bodies 20. Fourth, the method may include automatically channeling the deodorized ambient air into the auxiliary bodies 30 after passing through the primary bodies 20. Finally, a fifth step may include impregnating the deodorized .ambient air with a pleasant aroma as the primary bodies 20 are compressed such that the deodorized and impregnated ambient is thereafter released from the auxiliary bodies 30. In an alternate embodiment, the present invention 10 may be produced with an identically designed seat back to further enhance the deodorizing and air 5 freshening capabilities.

Further embodiments may include the seat cover being attached to a seat back with vibrating, heating, or back massaging capabilities to provide users with air cleansing and freshening during these relaxing and soothing procedures. Also, the present invention 10 may be designed to fit bar stools, toilet seats, office furniture, and many other applications to employ the beneficial effects of cleansing the air in a user's environment.

Figure 5:
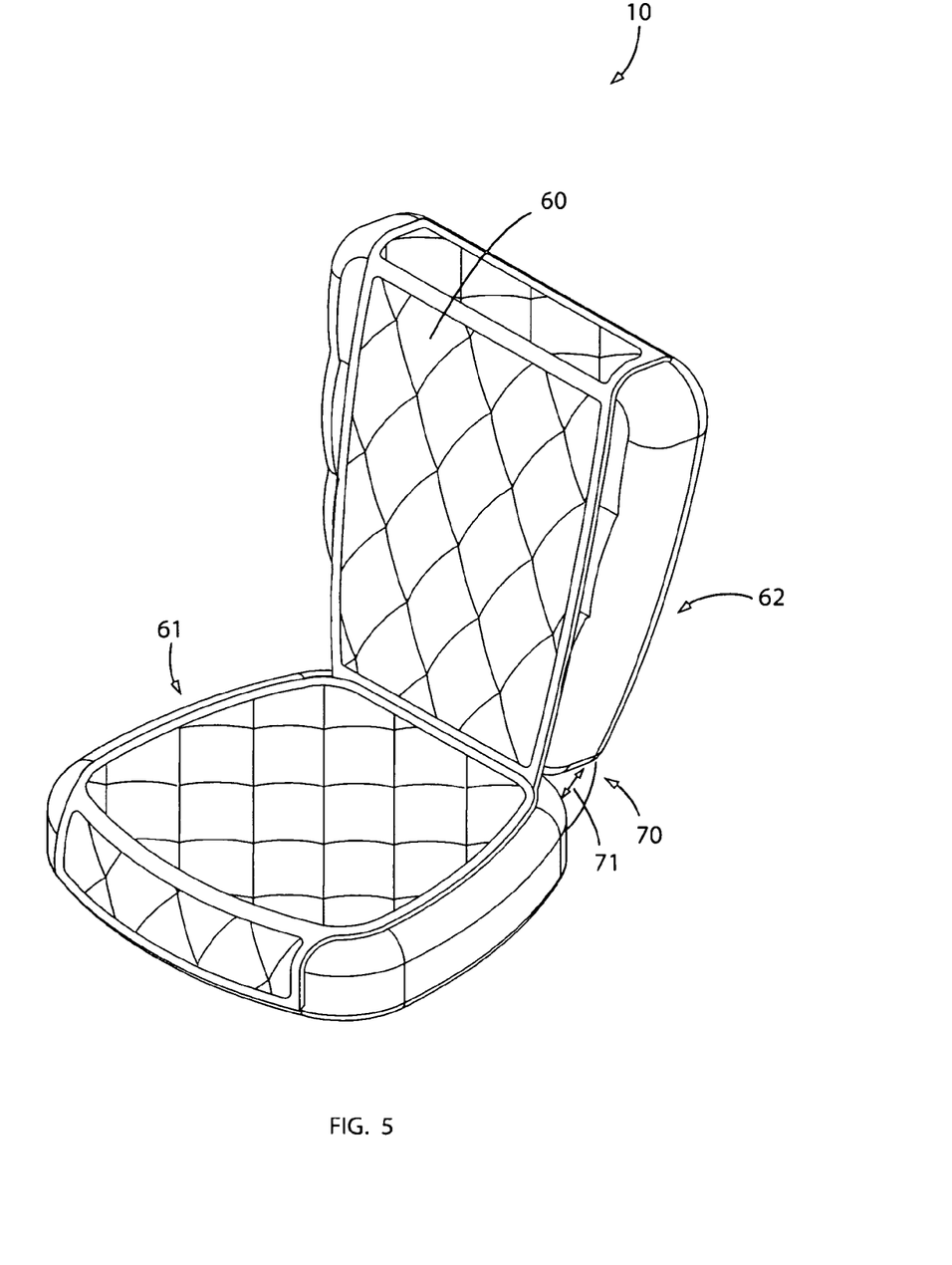
FIG. 5 is a perspective view of the liner covering the pivotally coupled seat and back portions of the apparatus.
Figure 6:
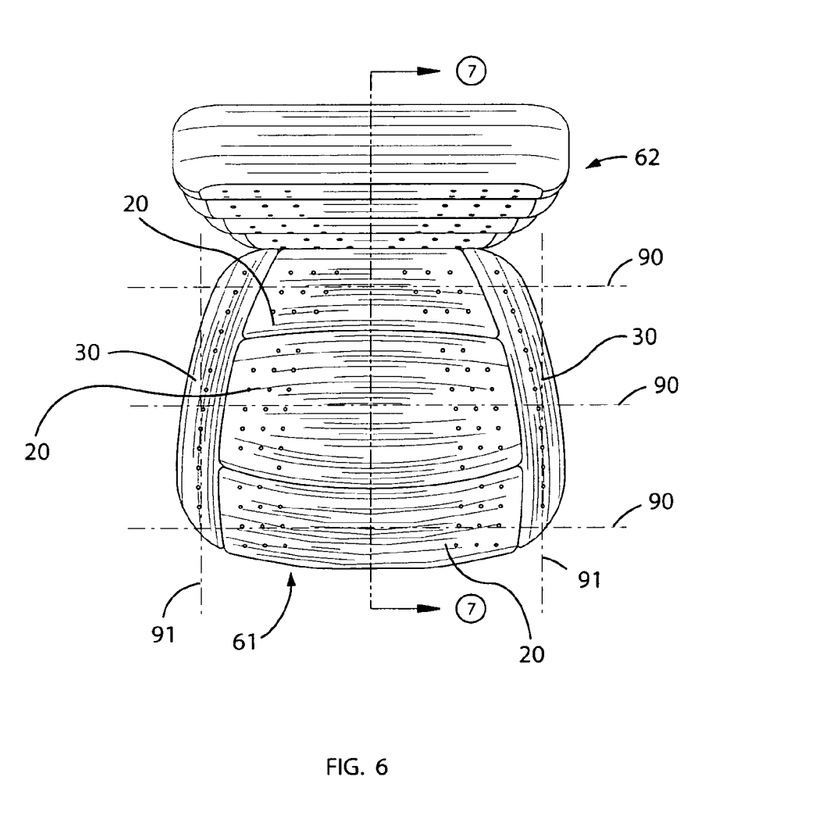
FIG. 6 is a top plan view of the seat and back portions of the apparatus.
Figure 7:
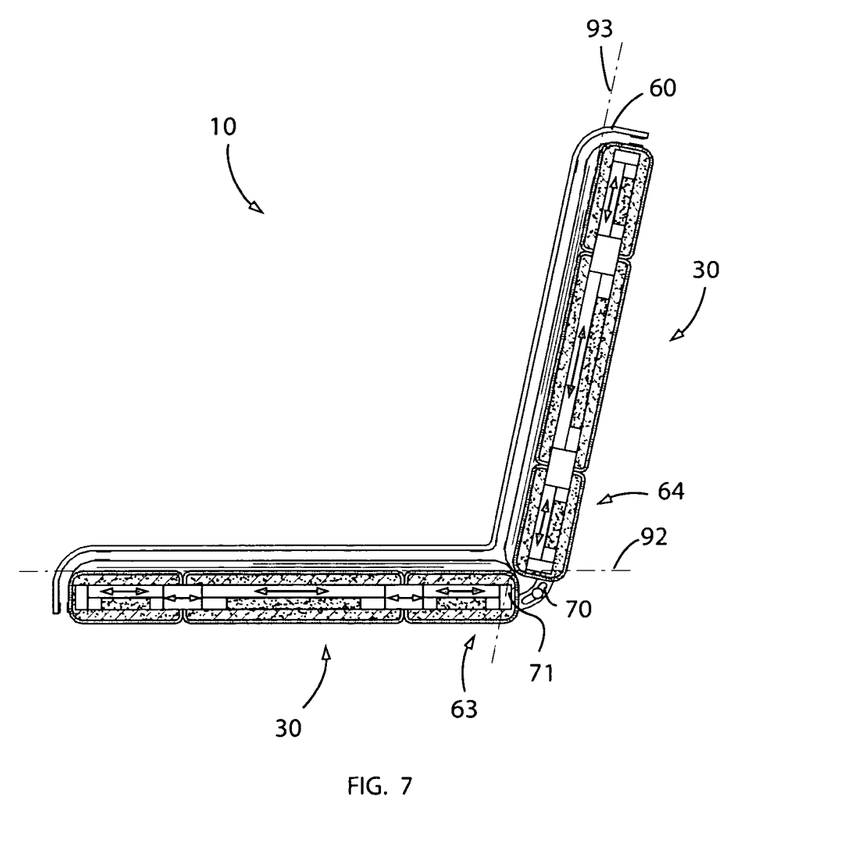
FIG. 7 is a cross-sectional view of the seat and back portions along line 7-7 shown in FIG. 6.

Referring to FIGS. 5-7, the apparatus 10 may further include an air-permeable fluid-absorbent liner 60 preferably having a single and unitary body provided with pivotally coupled seat and back portions 61, 62 removably positioned over the primary and auxiliary bodies 20, 30, respectively. Such a liner 60 provides the unexpected and unpredictable advantage of absorbing the perspiration from a user's back and further prevents the odorous fluid from penetrating into the seat and back portions 61, 62 respectively. The liner 60 may further be removed for cleaning as desired thus advantageously reused so that the apparatus 10 may last for a much longer life span.

Referring to FIGS. 5-7, each of the primary bodies 20 preferably has a primary longitudinal axis 90 axially offset from an adjacent one of the primary longitudinal axes 90 and an auxiliary longitudinal axis 91 registered substantially orthogonal to each of the primary longitudinal axes 90 of the primary bodies 20 respectively.

As perhaps best shown in FIGS. 5-7, a first group 63 of the primary bodies 30 may be aligned subjacent to a first plane 92 and may be adapted to receive a user buttock thereon while a second group 64 of the primary bodies 30 may be aligned posterior of a second plane 93 and may be adapted to receive a user back thereagainst. In this way, the apparatus 10 can be configured into the pivotally coupled seat and back portions 61, 62 of the liner 60 and advantageously allows the liner 60 to maintain continuous contact with the first and second groups of primary bodies 63, 64.

Referring to FIGS. 5-7, a communication channel 70 defines a curvilinear passageway 71 intermediately connected to the first and second groups of primary bodies 63, 64. Such a communication channel 70 continuously extends between the first and second groups of primary bodies 63, 64 such that deodorized air is freely circulated therebetween. In this manner, the impregnating mechanism 50 of one of the first group 63 of primary bodies 30 may be in fluid communication with the impregnating mechanism 50 of one of the second group 64 of primary bodies 30. Such an arrangement provides the unexpected and unpredictable advantage of enabling the impregnating mechanism 50 to be arranged in a continuous flow extending from the seat portion to the back rest portion of the apparatus 10. Thus, when pressure is applied to the seat portion (such as when sitting on it), deodorized air is channeled through the first group of primary bodies 63 up to the second group of primary bodies 64. In this manner, the deodorizing mechanism 40 circulates air back and forth between the seat and back rest portions before they are released into the surroundings of the vehicle or office space. Such a configuration ensures bad aroma is removed from the air prior to releasing the air from the first and second groups of primary bodies 63, 64.

Referring again to FIG. 6, the first and second planes 92, 93 may further be non-overlapping and mutually exclusive and be registered along horizontal and vertical planes respectively. Such an arrangement provides the unexpected and unpredictable advantage of allowing the back portion 62 to be folded over the seat portion 61 for easy removal and transporting or for preventing the liner 60 from being heated by the hot sun for example.

The method may further include: wherein each of the primary bodies 20 preferably having a primary longitudinal axis 90 axially offset from an adjacent one of the primary longitudinal axes 90, wherein each of the auxiliary bodies 30 preferably has an auxiliary longitudinal axis 91 registered substantially orthogonal to each of the primary longitudinal axes 90 of the primary bodies 20 respectively; providing an air-permeable fluid-absorbent liner 60 preferably having a single and unitary body provided with pivotally coupled seat and back portions 61, 62; removably positioning the air-permeable fluid-absorbent liner 60 over the primary and auxiliary bodies 30 respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A combined deodorizing and air freshening vehicle seat cushion for removing odors and releasing a pleasant aroma in a vehicle, said combined deodorizing and air freshening vehicle seat cushion comprising:
   a plurality of centrally aligned primary bodies oriented in a side-by-side configuration; and
   a plurality of auxiliary bodies contiguously conjoined to said primary bodies and being laterally spaced apart at opposed ends of said primary bodies respectively;
   wherein said primary bodies comprise means for deodorizing ambient air by removing air-borne odor from the ambient air;
   wherein said auxiliary bodies comprise means for impregnating the deodorized ambient air with a pleasant aroma as said primary bodies are compressed in such a manner that the deodorized and impregnated ambient air is thereafter released from said auxiliary bodies;
   wherein said ambient air deodorizing means and said impregnating means are in fluid communication with each other for automatically channeling the ambient air into said auxiliary bodies after deodorizing the ambient air;
   wherein each of said primary bodies has a primary longitudinal axis axially offset from an adjacent one of said primary longitudinal axes;
   wherein each of said auxiliary bodies has an auxiliary longitudinal axis registered substantially orthogonal to each of said primary longitudinal axes of said primary bodies respectively.

2. The combined deodorizing and air freshening vehicle seat cushion of claim 1, wherein a first group of said primary bodies are aligned subjacent to a first plane and are adapted to receive a user buttock thereon, wherein a second group of said primary bodies are aligned posterior to a second plane and are adapted to receive a user back thereagainst.

3. The combined deodorizing and air freshening vehicle seat cushion of claim 2, further comprising:
   a communication channel defining a passageway intermediately connected to said first and second groups of primary bodies, said communication channel continuously extending between said first and second groups of primary bodies such that deodorized air is freely circulated therebetween;
   wherein said impregnating means of one of said first group of primary bodies is in fluid communication with said impregnating means of one of said second group of primary bodies.

4. The combined deodorizing and air freshening vehicle seat cushion of claim 2, wherein said first and second planes are non-overlapping and mutually exclusive.

5. The combined deodorizing and air freshening vehicle seat cushion of claim 2, wherein said first and second planes are registered along horizontal and vertical planes respectively.

6. The combined deodorizing and air freshening vehicle seat cushion of claim 1, wherein said impregnating means is located downstream of said ambient air deodorizing means.

7. The combined deodorizing and air freshening vehicle seat cushion of claim 1, wherein said ambient air deodorizing means comprises:
   a deformably resilient inner layer spanning along an inner perimeter of each of said primary bodies such that a hollow cavity is defined between said inner layer, said inner layer being provided with a plurality of orifices formed therein and penetrating through an outer surface of primary bodies respectively for permitting the ambient air to enter said cavity; and
   a predetermined quantity of a deodorizing agent contained within said cavity for filtering the airborne odor;
   wherein the deodorized ambient air is forcibly urged laterally towards opposed ends of said cavity when a user sits on said primary bodies such that the deodorized ambient air is dissipated throughout said cavity and thereby cleansed of the airborne odors.

8. The combined deodorizing and air freshening vehicle seat cushion of claim 2, wherein said deodorizing agent comprises: a deodorizing agent selected from a group including charcoal powder, rigid annular charcoal balls and any combination thereof.

9. The combined deodorizing and air freshening vehicle seat cushion of claim 2, wherein said impregnating means comprises:
   a plurality of outlet ports formed in said inner layer and extending through to said auxiliary bodies such that said outlet ports terminate inside said auxiliary bodies; and
   first and second pairs of flaps pivotally coupled to said inner layer and positioned adjacent to said outlet ports respectively;
   wherein said first and second pairs of flaps are situated at a closed equilibrium position when said inner layer is at an equilibrium position and thereby prohibit the deodorized ambient air from passing through said outlet ports;
   wherein said first and second pairs of flaps automatically pivot to a tensioned open position when an external force is downwardly exerted onto said inner layer such that the deodorized ambient air is laterally forced through said outlet ports and deposited into said auxiliary bodies respectively.

10. A combined deodorizing and air freshening vehicle seat cushion for removing odors and releasing a pleasant aroma in a vehicle, said combined deodorizing and air freshening vehicle seat cushion comprising:
    a plurality of centrally aligned primary bodies oriented in a side-by-side configuration;
    a plurality of auxiliary bodies contiguously conjoined to said primary bodies and being laterally spaced apart at opposed ends of said primary bodies respectively; and
    an air-permeable fluid-absorbent liner having a single and unitary body provided with pivotally coupled seat and back portions removably positioned over said primary and auxiliary bodies respectively;
    wherein said primary bodies comprise means for deodorizing ambient air by removing air-borne odor from the ambient air;
    wherein said auxiliary bodies comprise means for impregnating the deodorized ambient air with a pleasant aroma as said primary bodies are compressed in such a manner that the deodorized and impregnated ambient air is thereafter released from said auxiliary bodies;
    wherein said ambient air deodorizing means and said impregnating means are in fluid communication with each other for automatically channeling the ambient air into said auxiliary bodies after deodorizing the ambient air;

wherein each of said primary bodies has a primary longitudinal axes axially offset from an adjacent one of said primary longitudinal axes;

wherein each of said auxiliary bodies has an auxiliary longitudinal axis registered substantially orthogonal to each of said primary longitudinal axes of said primary bodies respectively.

11. The combined deodorizing and air freshening vehicle seat cushion of claim 10, further comprising:

a communication channel defining a passageway intermediately connected to said first and second groups of primary bodies, said communication channel continuously extending between said first and second groups of primary bodies such that deodorized air is freely circulated therebetween;

wherein a first group of said primary bodies are aligned along a first plane and are adapted to receive a user buttock thereon, wherein a second group of said primary bodies are aligned along a second plane and are adapted to receive a user back thereagainst.

12. The combined deodorizing and air freshening vehicle seat cushion of claim 11, wherein said impregnating means and said ambient air deodorizing means of one of said first group of primary bodies is in fluid communication with said impregnating means of one of said second group of primary bodies.

13. The combined deodorizing and air freshening vehicle seat cushion of claim 11, wherein said first and second planes are non-overlapping and mutually exclusive.

14. The combined deodorizing and air freshening vehicle seat cushion of claim 11, wherein said first and second planes are registered along horizontal and vertical planes respectively.

15. The combined deodorizing and air freshening vehicle seat cushion of claim 10, wherein said impregnating means is located downstream of said ambient air deodorizing means.

16. The combined deodorizing and air freshening vehicle seat cushion of claim 10, wherein said ambient air deodorizing means comprises:

a deformably resilient inner layer spanning along an inner perimeter of each of said primary bodies such that a hollow cavity is defined between said inner layer, said inner layer being provided with a plurality of orifices formed therein and penetrating through an outer surface of primary bodies respectively for permitting the ambient air to enter said cavity; and a predetermined quantity of a deodorizing agent contained within said cavity for filtering the airborne odor;

wherein the deodorized ambient air is forcibly urged laterally towards opposed ends of said cavity when a user sits on said primary bodies such that the deodorized ambient air is dissipated throughout said cavity and thereby cleansed of the airborne odors.

17. The combined deodorizing and air freshening vehicle seat cushion of claim 11, wherein said deodorizing agent comprises: a deodorizing agent selected from a group including charcoal powder, rigid annular charcoal balls and any combination thereof.

18. The combined deodorizing and air freshening vehicle seat cushion of claim 11, wherein said impregnating means comprises:

a plurality of outlet ports formed in said inner layer and extending through to said auxiliary bodies such that said outlet ports terminate inside said auxiliary bodies; and first and second pairs of flaps pivotally coupled to said inner layer and positioned adjacent to said outlet ports respectively;

wherein said first and second pairs of flaps are situated at a closed equilibrium position when said inner layer is at an equilibrium position and thereby prohibit the deodorized ambient air from passing through said outlet ports;

wherein said first and second pairs of flaps automatically pivot to a tensioned open position when an external force is downwardly exerted onto said inner layer such that the deodorized ambient air is laterally forced through said outlet ports and deposited into said auxiliary bodies respectively.

19. A method for removing odors from ambient air and releasing a pleasant aroma in a vehicle, said method comprising the chronological steps of:

a. providing and orienting a plurality of centrally aligned primary bodies in a side-by-side configuration;

b. providing and contiguously conjoining a plurality of auxiliary bodies to said primary bodies by laterally spacing apart said auxiliary bodies at opposed ends of said primary bodies respectively, wherein each of said primary bodies has a primary longitudinal axis axially offset from an adjacent one of said primary longitudinal axes, wherein each of said auxiliary bodies has an auxiliary longitudinal axis registered substantially orthogonal to each of said primary longitudinal axes of said primary bodies respectively;

c. providing an air-permeable fluid-absorbent liner having a single and unitary body provided with pivotally coupled seat and back portions;

d. removably positioning said air-permeable fluid-absorbent liner over said primary and auxiliary bodies respectively;

e. deodorizing ambient air by removing air-borne odor from the ambient air while traveling through said primary bodies;

f. automatically channeling the deodorized ambient air into said auxiliary bodies after passing through said primary bodies; and g. impregnating the deodorized ambient air with a pleasant aroma as said primary bodies are compressed such that the deodorized and impregnated ambient is thereafter released from said auxiliary bodies.

* * * * *